…

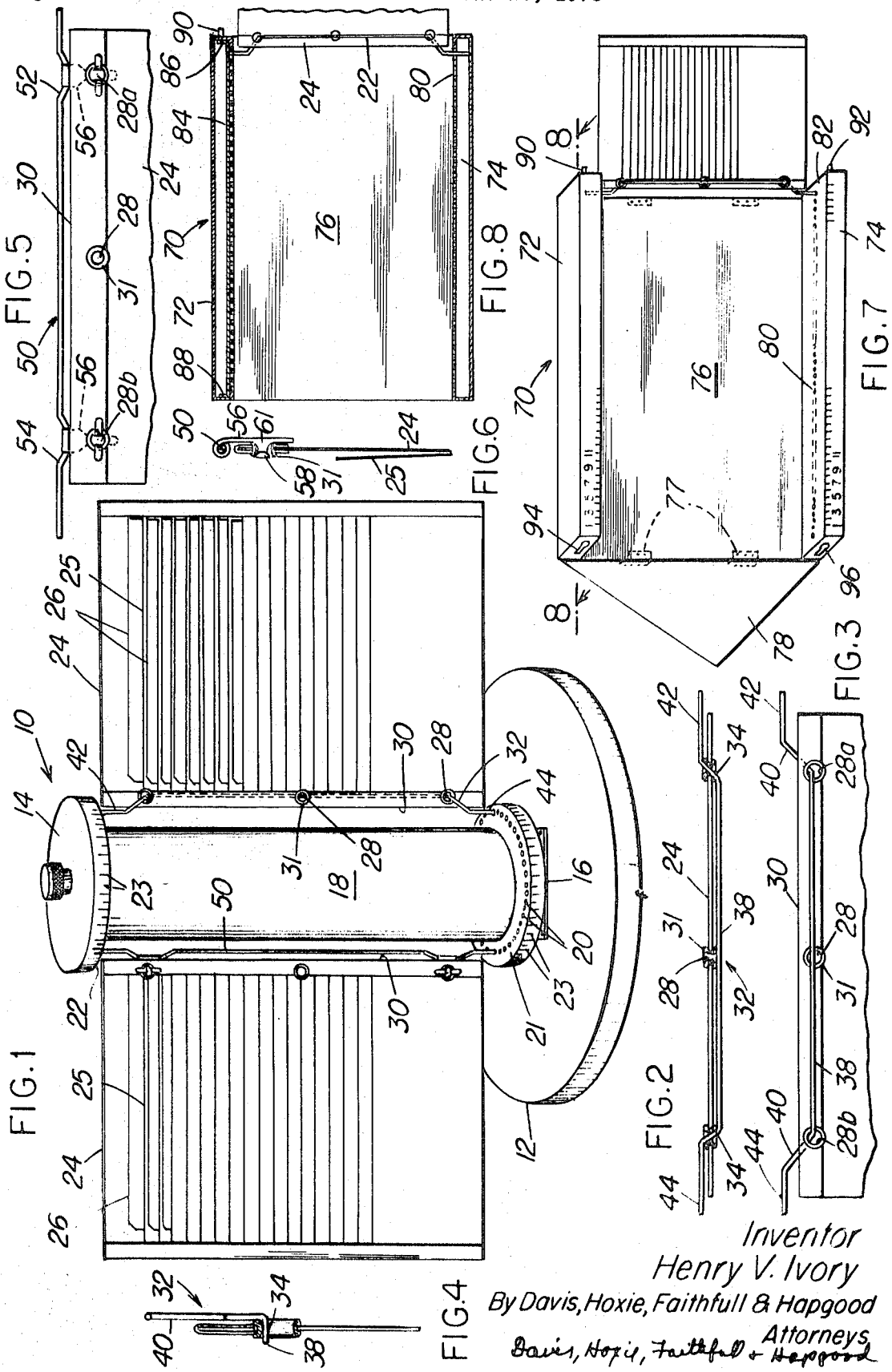

United States Patent Office 3,618,242
Patented Nov. 9, 1971

3,618,242
DOCUMENTARY DISPLAY UNIT AND MOUNTS USED THEREWITH
Henry V. Ivory, Chatham, N.J., assignor to Boorum & Pease Company, Brooklyn, N.Y.
Filed Jan. 23, 1970, Ser. No. 5,220
Int. Cl. G09f *11/06*
U.S. Cl. 40—104.18                                    7 Claims

ABSTRACT OF THE DISCLOSURE

There is disclosed a document display and storage unit and a hinge rod for pivotally mounting a document thereon. The unit includes a pair of spaced support members having corresponding holes to receive the hinge rods bearing the documents. The hinge rods have means for passing through and securing the documents such that the documents are coplanar with the hinge rods and the inner edge of the documents do not extend inwardly beyond the document's pivot axis, thus permitting compact mounting of the documents on the units with freedom to rotate the documents for access to both sides thereof.

---

This invention relates to document display and storage units and, more particularly, to an improved display and storage unit including means for mounting the documents on the units.

There is a growing demand for various means for storing and displaying information contained on panels or sheet material, such as heavy paper. One conventional way of storing this material in a manner which permits ready accessibility to both sides thereof is by means of a ring binder notebook, conventionally known as a looseleaf book. For certain applications, it is preferable to mount these sheets on a display unit such that the sheets may be stored relatively vertically and accessed with ease and a minimum of damage to the sheet and the material contained thereon. It is desirable that these sheets be able to be mounted on the display units in close proximity to one another so that a maximum number of sheets may be stored on a single display unit in a minimum amount of space. It also is desirable that the same sheets which are used with ring binders be capable of being mounted on the display units without alteration. These desirable features are obtained by the subject matter of this invention and further objects and attendant advantages of the present invention will become apparent from the following description taken in combination with the accompanying drawings in which:

FIG. 1 is a perspective view of a rotary display and storage unit formed in accordance with one embodiment of this invention, FIG. 2 is a top view of one form of hinge rod mount used for supporting sheet material on a display and storage unit, FIG. 3 is a side view of the hinge rod of FIG. 2, FIG. 4 is an end view of the hinge rod of FIG. 2, FIG. 5 is a side view of a second form of hinge rod mount used for supporting sheet material on a display and storage unit, FIG. 6 is an end view of the hinge rod of FIG. 5, FIG. 7 is a perspective view of an easel display and storage unit formed in accordance with a second embodiment of this invention, and FIG. 8 is an elevational sectional view of the display and storage unit taken along line 8—8.

Briefly stated, this invention, in one form, comprises in combination, a novel display and storage unit for mounting sheets in combination with the sheet mounting means. The display unit includes a pair of spaced apart upper and lower support members, each having a plurality of corresponding holes provided in the facing surfaces. The support members can be rotatably mounted upon a base or they can be attached to a stationary base. The sheets are mounted on the support members by means of a novel document mount or hinge rod. One form of hinge rod includes a plurality of tangs offset transversely from the rod, the tangs including foldable members which may be inserted through holes provided in the sheet adjacent to one edge of the sheet. The tangs are offset from the plane of the rod such that when the sheet is mounted upon the tangs the rod and sheet are coplanar. Furthermore, the foldable members of the tangs are offset from the primary axis of the rod so that the edge of the sheet adjacent the holes does not extend beyond the primary axis of the rod. These features of the rod enable adjacent sheets to be mounted closely together without interfering with the pivotability of the sheets on the display unit.

Turning now to the drawings, and more particularly to FIG. 1, there is illustrated a rotatable display and storage unit 10, hereinafter called a display unit for convenience. The display unit 10 includes a base member 12, an upper support member 14, a lower support member 16 and a vertical central post 18. The upper support member 14 and lower support member 16, in the form of circular discs, are fixedly mounted upon the central post 18 which spaces the support members 14, 16 apart a desirable distance to accommodate particular sized sheets which are intended to be mounted thereon. The upper and lower support members 14, 16 and central post 18 form a single rotatable member mounted for rotation upon the base 12 by any conventional means, such as a conventional ball bearing adapter ((not shown) having one-half the raceway mounted upon the underside of the lower support member 16 and the other half of the raceway mounted upon the upper surface of the base member 12.

A plurality of holes 20 are provided about the periphery and through the upper surface 21 of the lower support member 16. A corresponding set of holes (not shown) are provided through the lower surface 22 of the upper support member 14. Alternating long and short lines 23, or other indicia, are inscribed on the support members 14, 16 to identify the corresponding holes and relate them to one another.

The display unit 10 is intended to support and store panels or sheets 24 of various types. One specific type of sheet intended to be stored is a sheet having pockets 25 on both sides thereof for storing flat elements 26, such as micro-fiche. The sheets 24 or pages conventionally are provided with at least two and usually three holes 28 located adjacent to one longitudinal edge 30. These holes can be provided with metal reinforcing rings 31 to provide support and prevent tearing of the sheets. These holes are conventionally spaced to permit mounting of the sheets in standard ring binders such as looseleaf books (not shown).

A document mount 32 in the form of a hinge rod, shown in FIGS. 2, 3 and 4 is designed to permit easy mounting of the sheets 24 on the display unit 10 without modification of the sheet and in such a way as to allow placement of the sheets in immediate juxtaposition to one another without interfering with the pivotability of each of the sheets thus allowing access to the elements 26 mounted on the sides of the sheets in the pockets 25. To accomplish this result, it is necessary that the rear edge 30 of the sheet 24 not extend inwardly toward the central post 18 beyond that portion of the hinge rod 32 which is the axis of rotation for the sheet. This is achieved by providing two transverse relatively perpendicular offsets near each end of the rod. FIG. 2 illustrates a first offset 34, which offset is provided to allow the hinge rod 32 to pass through the outermost holes 28a, 28b of sheet 24. The offset 34 is transverse to the primary axis 36 which extends throughout the central portion 38 and majority of the rod 32. The amount of the offset is slightly greater than the thickness of the sheet 24 so that the rod 32 may be easily inserted through the holes 28a, 28b while preventing a substantial amount of play in a direction transverse to the primary axis 36. The hinge rod 32, being made of resilient wire of relatively small diameter, for example approximately 1/16", is easily inserted through the holes by inserting one end of the hinge rod 32 through the first hole 28b and then slightly flexing the sheet 24 and hinge rod 32 so that the other end of the rod 32 may be easily inserted through the other hole 28a. The hinge rod then is moved into position so that the offset portions 34 pass through the holes 28a, 28b.

The second offset 40 is illustrated in FIG. 3. The second offset 40 is mutually transverse to the primary axis 36 and to the first offset 34. The purpose of the second offset 40 is to place the ends 24, 44 of the hinge rod 32 beyond the inner edge 30 of the sheet 24. The amount of the second offset 40 is greater than the distance between the holes 28 and the edge 30 of the sheet 24. The end 42, 44 of the hinge rod 32 form the means for mounting the hinge rod and sheet on to the display unit 10. The ends are inserted into the holes 20 in the upper and lower support members 14, 16, the fit being such that the sheets 24 may be easily rotated about an axis through the hinge rod ends 42, 44. The hinge rod is inserted into the display unit by placing the upper end 42 into a hole in the upper support 14 an amount sufficient to allow the lower end 44 to be located above the upper surface 21 of the lower support 16. The lower end 44 is then inserted into a hole 20 corresponding to the upper hole which is used and the hinge rod is lowered into place. The depth of the hole 20 in the lower support member 16 is such that when the hinge rod 32 drop into its lowest position, the upper end 42 still is retained within the hole in the upper support member 14 and has sufficient length within the upper support member to prevent inadvertent dislodging.

A second form of hinge rod 50 for accomplishing the same purpose is illustrated in FIGS. 5 and 6. The hinge rod 50 is formed with at least two offset reliefs 52, 54 spaced apart a distance corresponding to the spacing between the holes 28a and 28b on the sheets 24. Mounted on each of the reliefs 52, 54 is a tang 56, the tang having a pair of upwardly extending bendable shanks 58, 60. The sheet 24 is mounted on the hinge rod 50 by inserting the shanks 58, 60 through the holes 28a, 28b in the sheet and bending the shanks in opposite directions. The hinge rod 50 and mounted sheet 24 are then rotatably mounted on the display unit 10 in the same manner as was described above with respect to the hinge rod 32.

As can be seen in FIG. 6, the tangs 56 are mounted on the hinge rod 50 by coining a portion thereof around the hinge rod in such a manner that the main body 61 of the tang is displaced from the hinge rod and the shanks 58, 60 extend in the direction of the hinge rods. With this arrangement, the sheet 24 is coplanar with the hinge rod 50 in order to conserve space when the sheets are mounted on the display unit 10. Furthermore, the tangs 56 are mounted on the reliefs 52, 54 in order to prevent the tangs from sliding axially along the hinge rod.

The tangs 56 extend from the hinge rod a length greater than the distance of the holes 28 from the edge of the sheet 24. This insures that the hinge rod 50, which serves as an axis of rotation for the sheet 24 when mounted on the display unit 10, is offset inwardly from the inner edge 30 of the sheet 24. The length of the tang serves the same purpose as the second offset 34 of the hinge rod 32 described above and illustrated in FIGS. 2 through 4. Insuring that the axis of rotation of the sheet and hinge rod is at least even with and preferably offset from the inner edge of the sheet 30 permits location of the sheets 24 in close proximity to one another. If the inner edge 30 of the sheet 24 projected inwardly beyond its axis of rotation there would be a tendency for the inner portion of the sheets to abut against the inwardly extending portion of adjacent sheets thereby either requiring greater spacing between adjacent sheets or, in the alternative, reducing the degree movement of the sheets 24. By the use of the first offset 34 with the hinge rod 32 and by the use of the tangs 56 of the hinge rod 50, the sheets 24 can be mounted on the hinge rods without modification of the sheets by utilization of the holes 28 which conventionally are located in the sheets. These holes also permit mounting of the same sheets in conventional looseleaf binders.

A stationary display unit in the form of an easel 70 is illustrated in FIGS. 7 and 8. The easel display unit 70 is formed with an upper support member 72 and a lower support member 74, the support members 72, 74 being parallel and spaced apart a distance less than the total length of the hinge rods 32 and 50. The upper and lower support member 72, 74 are mounted on a back 76 which has pivotally attached thereto by means of hinges 77, a pair of triangular supports, only one of which is shown at 78. The upper and lower supports 72, 74 are provided with a series of corresponding spaced holes 80 to receive the hinge rods. The depth of the holes of the upper support member 72 is sufficient to allow the hinge rods to move upwardly so that the lower end of the hinge rod clears the upper surface 82 of the lower support member 74. The lower end of the hinge rod is then inserted in the hole 80 corresponding to the upper hole in which the upper end of the hinge rod is placed and the hinge rod is lowered into position. The depth of the lower hole 80 is such that when the rod drops to its lowermost position, the upper portion of the rod is retained within the hole of the upper support member 72.

In order to stabilize the hinge rods and sheets within the easel unit 70 a locking means 84, for example, a strip of resilient plastic or spring metal, may be mounted within the upper support member 72 such as by attaching flanged ends 86, 88 to opposite ends of the upper support member 72. When the hinge rod is inserted through the holes in the upper support member 72 the locking means 84 is flexed upwardly permitting the lower end of the hinge rod to be maneuvered as desired. When the hinge rod is lowered into the lower holes 80 in the lower support member 74 the locking member 84 forces the hinge rod downwardly and retains it in position.

The support members 72, 74 are provided with projecting keys 90, 92 respectively at one end thereof and with keyhole slots 94, 96 at the other end thereof. This enables a plurality of display units 70 to be joined together end to end to provide a display unit of any desired length.

As can be seen this invention provides two embodiments of a display and storage unit and two embodiments of a hinge rod to be used with the display and storage unit. The units and rods are designed so that conventional sheets of the type used for placing in ring binders may be easily assembled on the units in close proximity to one another and yet in a manner which permits the sheets to be pivoted to allow complete examination of both sides of the sheet. The hinge rods are designed to enable easy and rapid mounting and unmounting of the sheets from the display rod and the hinge rods themselves are capable of easy and rapid mounting and unmounting from the display units.

I claim:

1. In combination, a display unit comprising spaced part upper and lower support members, each of said support members having aligned corresponding holes, a plurality of hinge rods for pivotally supporting sheets having holes therethrough adjacent to one edge of the sheets, each of the rods having a primary axis extending throughout the length of the majority of the rod and means offset from the primary axis for passing through and securing the sheet to the rod, the means being offset away from the ends of the rod an amount sufficient to prevent said edge of the sheet from extending transversely beyond the ends of the rod, the ends of the rod being received by the holes in the support members.

2. A combination as defined in claim 1 wherein the upper and lower support members are circular discs having a plurality of holes adjacent the periphery thereof, wherein the support members are fixedly interconnected and wherein the support members are rotatably mounted on a base.

3. A combination as defined in claim 1 wherein the upper and lower support members are elongated and parallel to each other and are provided with a plurality of corresponding holes along the length of the support members and through the facing surfaces of the support members.

4. A combination as defined in claim 2 wherein said means comprises at least two spaced apart tangs mounted on the rod.

5. A combination as defined in claim 3 wherein said means comprises at least two spaced apart tangs mounted on the rod.

6. A combination as defined in claim 2 wherein said means comprises (a) a first portion adjacent each end of the rod, the first portion being offset transverse to said primary axis an amount approximately equal to the thickness of said sheet and (b) a second portion between said first portion and the end of the rod, said second portion being offset mutually transverse to said primary axis and the direction of offset of said first portion, said second portion being offset an amount greater than the distance between said holes and said one edge of said sheet.

7. A combination as defined in claim 3 wherein said means comprises (a) a first portion adjacent each end of the rod, the first portion being offset transverse to said primary axis an amount approximately equal to the thickness of said sheet and (b) a second portion between said first portion and the end of the rod, said second portion being offset mutually transverse to said primary axis and the direction of offset of said first portion, said second portion being offset an amount greater than the distance between said holes and said one edge of said sheet.

References Cited

UNITED STATES PATENTS

| | | | |
|---|---|---|---|
| 1,049,886 | 1/1913 | Manson | 40—72 |
| 1,414,754 | 5/1922 | Smith | 40—72 |
| 1,777,438 | 10/1930 | Johnson | 40—104.18 |
| 3,171,223 | 3/1965 | Josephson | 40—102 |
| 3,302,318 | 2/1967 | Lewis | 40—72 X |

ROBERT W. MICHELL, Primary Examiner

W. J. CONTRERAS, Assistant Examiner